US012731904B2

(12) United States Patent
Liao et al.

(10) Patent No.: US 12,731,904 B2
(45) Date of Patent: Sep. 8, 2026

(54) HELICAL ANTENNA

(71) Applicant: Compal Electronics, Inc., Taipei City (TW)

(72) Inventors: Yan-Jie Liao, Taipei City (TW); Kuan-Chieh Chiu, Taipei City (TW); Yong-Cheng Qiu, Taipei City (TW); Chun-I Lu, Taipei City (TW); Kai-Shyuan Chen, Taipei City (TW); Ming-Jyun Hou, Taipei City (TW)

(73) Assignee: Compal Electronics, Inc., Taipei City (TW)

( * ) Notice: Subject to any disclaimer, the term of this patent is extended or adjusted under 35 U.S.C. 154(b) by 92 days.

(21) Appl. No.: 19/028,167

(22) Filed: Jan. 17, 2025

(65) Prior Publication Data

US 2026/0180189 A1 Jun. 25, 2026

(30) Foreign Application Priority Data

Dec. 19, 2024 (TW) ................................ 113149555

(51) Int. Cl.
*H01Q 11/08* (2006.01)
*H01Q 1/38* (2006.01)

(52) U.S. Cl.
CPC ............... *H01Q 11/08* (2013.01); *H01Q 1/38* (2013.01)

(58) Field of Classification Search
CPC ............ H01Q 1/36; H01Q 1/362; H01Q 1/38; H01Q 5/10; H01Q 11/08
See application file for complete search history.

(56) References Cited

U.S. PATENT DOCUMENTS

| | | | |
|---|---|---|---|
| 6,421,029 | B1 | 7/2002 | Tanabe |
| 9,214,734 | B2 | 12/2015 | Huynh |
| 10,700,430 | B1 | 6/2020 | Abbasi |
| 10,916,856 | B1 | 2/2021 | Sayem et al. |
| 10,978,804 | B2 | 4/2021 | Haarakangas |

(Continued)

FOREIGN PATENT DOCUMENTS

| | | | |
|---|---|---|---|
| CN | 106329069 | A | 1/2017 |
| CN | 207217759 | U | 4/2018 |

(Continued)

*Primary Examiner* — Robert Karacsony
(74) *Attorney, Agent, or Firm* — KIRTON McCONKIE; Evan R. Witt

(57) ABSTRACT

The present disclosure provides a helical antenna. The helical antenna includes a feeder board and four radiation components. The four radiation components are electrically coupled with the feeder board, respectively. A dielectric space is formed among the feeder board and the four radiation components. The four radiation components are circularly arranged at intervals, and any cross-section of the four radiation components parallel to a top surface of the feeder board is circular. Each of the four radiation components includes a feeding unit and a radiation portion. The feeding unit is electrically coupled between the radiation portion and the feeder board. The radiation portion is configured to transmit and receive a wireless signal in a first frequency band. An end of the radiation portion is in connection with the short circuit portion, and the other end of the radiation portion is in connection with the feeding portion.

11 Claims, 10 Drawing Sheets

(56) References Cited

U.S. PATENT DOCUMENTS

| | | | | |
|---|---|---|---|---|
| 2006/0125712 | A1 * | 6/2006 | Sharaiha | H01Q 11/08 343/895 |
| 2022/0320741 | A1 | 10/2022 | Zhang | |
| 2026/0031538 | A1 * | 1/2026 | Botros | H01Q 5/378 |

FOREIGN PATENT DOCUMENTS

| | | | |
|---|---|---|---|
| CN | 109768388 | A | 5/2019 |
| CN | 116315648 | A | 6/2023 |
| EP | 1076378 | A2 | 2/2001 |
| TW | 201301654 | A | 1/2013 |
| TW | M578025 | U | 5/2019 |

* cited by examiner

300

HELICAL ANTENNA

CROSS-REFERENCE TO RELATED APPLICATION

This application claims priority to Taiwan Patent Application No. 113149555, filed on Dec. 19, 2024. The entireties of the above-mentioned patent application are incorporated herein by reference for all purposes.

FIELD OF THE INVENTION

The present disclosure relates to a signal transceiver, and more particularly to a helical antenna.

BACKGROUND OF THE INVENTION

With the development of the communication industry, the satellite communication has become an important communication transmission method for the sixth-generation mobile communication technology (6G). The satellite communication achieves the advantages of wide coverage and no restrictions on geographical environment. In addition, in natural disasters, wars or other emergencies, the satellite communication can provide stable emergency communications to ensure that important information is not interrupted. Moreover, the satellite communication has high-speed data transmission capabilities and can make up for the shortcomings of existing communication technologies.

Generally speaking, helical antennas have high stability and anti-interference capabilities, and are suitable for signal transmission and reception in satellite communications. However, traditional helical antennas have narrow frequency bands for transmitting and receiving signals, have larger size, and merely cover a single frequency band. Consequently, it is difficult to satisfy the requirements of dual-band or multi-band signal transmission and reception of the sixth-generation mobile communication technology.

Therefore, there is a need of providing a helical antenna to obviate the drawbacks encountered from the prior arts.

SUMMARY OF THE INVENTION

It is an objective of the present disclosure to provide a helical antenna, which achieves the advantages of transmitting and receiving multi-band signal, increasing the bandwidth of the transmitted and received frequency bands, circular polarization and miniaturization.

In accordance with an aspect of the present disclosure, there is provided a helical antenna. The helical antenna includes a feeder board and four radiation components. The feeder board is configured to feed signal and has a top surface. The four radiation components are electrically coupled with the feeder board, respectively. The four radiation components are spirally surrounded toward a direction away from the feeder board to form a dielectric space. The four radiation components are circularly arranged at intervals, and any cross-section of the four radiation components parallel to the top surface of the feeder board is circular. Each of the four radiation components includes a feeding unit and a radiation portion. The feeding unit includes a short circuit portion and a feeding portion. An end of the short circuit portion is in connection with the feeder board. The feeding portion is spaced adjacent to a side of the short circuit portion, and an end of the feeding portion is in connection with the feeder board. The radiation portion is configured to transmit and receive a wireless signal in a first frequency band. An end of the radiation portion is in connection with the short circuit portion, and the other end of the radiation portion is in connection with the feeding portion.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

Figure 1:
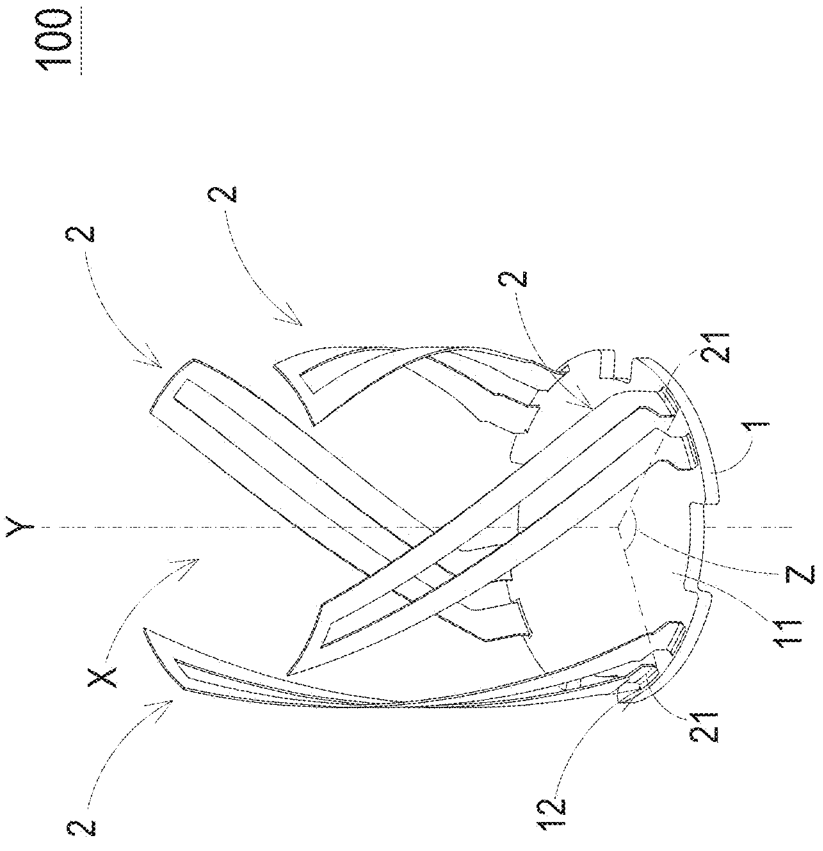
FIG. 1 is a structural schematic diagram illustrating a helical antenna according to a first embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "upper," "lower," "top," "bottom," "front," "rear" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first", "second" and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items.

Figure 2:
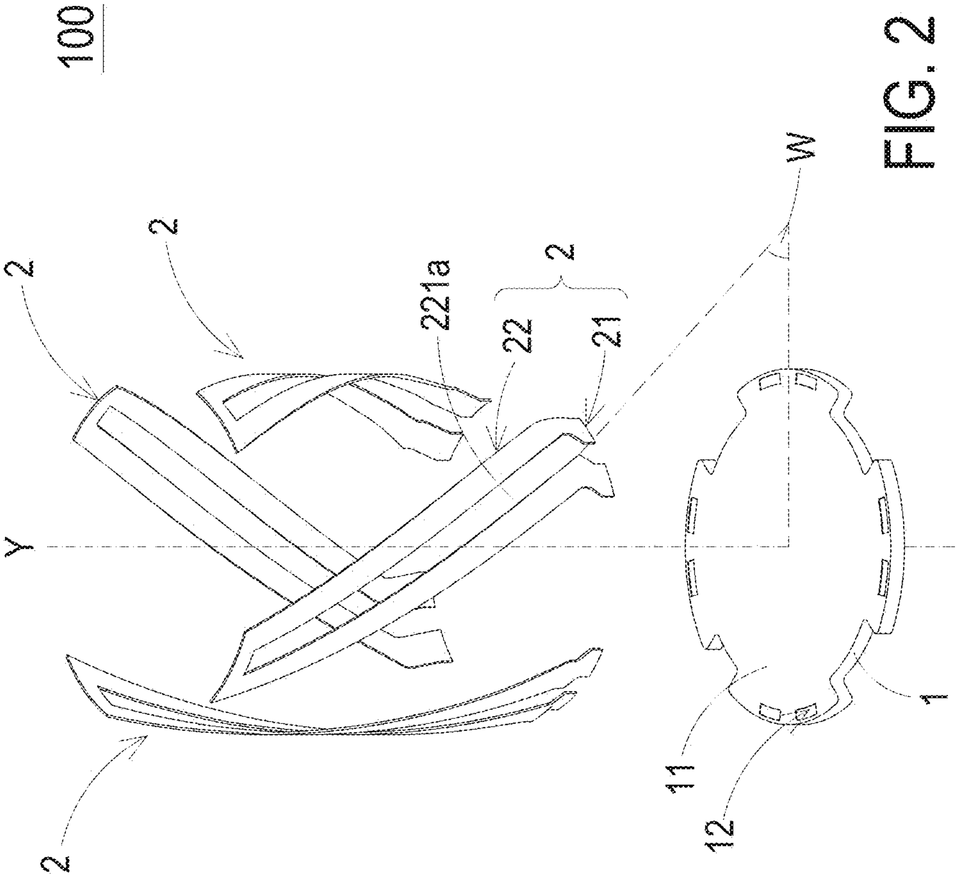
FIG. 2 is an exploded view illustrating the helical antenna of FIG. 1.
Figure 3:
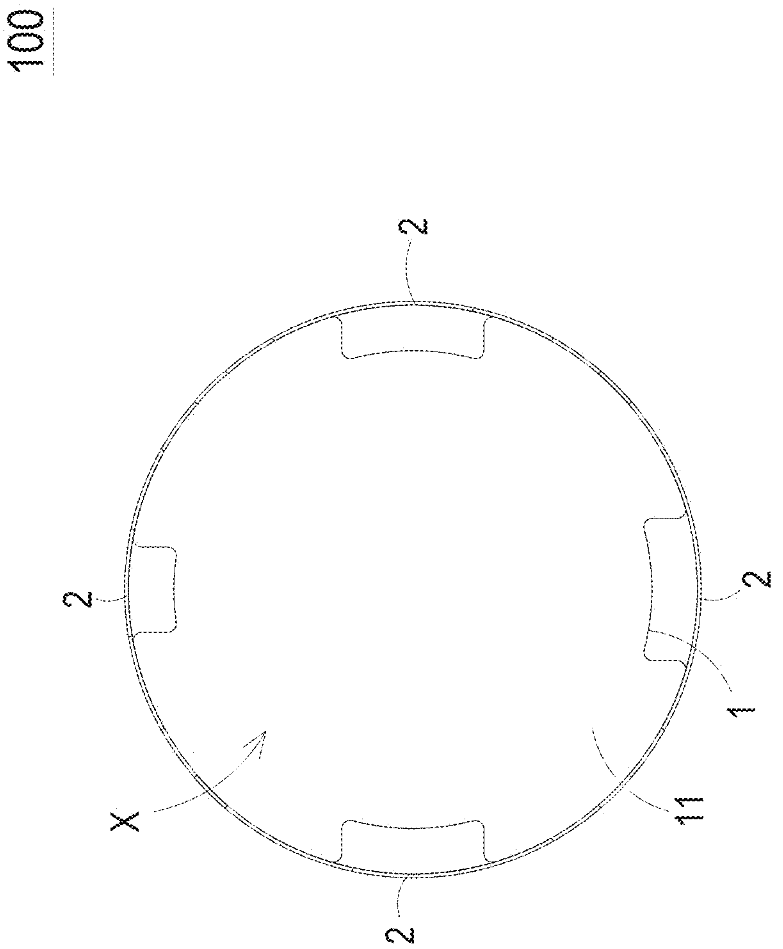
FIG. 3 is a top view illustrating the helical antenna of FIG. 1.
Figure 4:
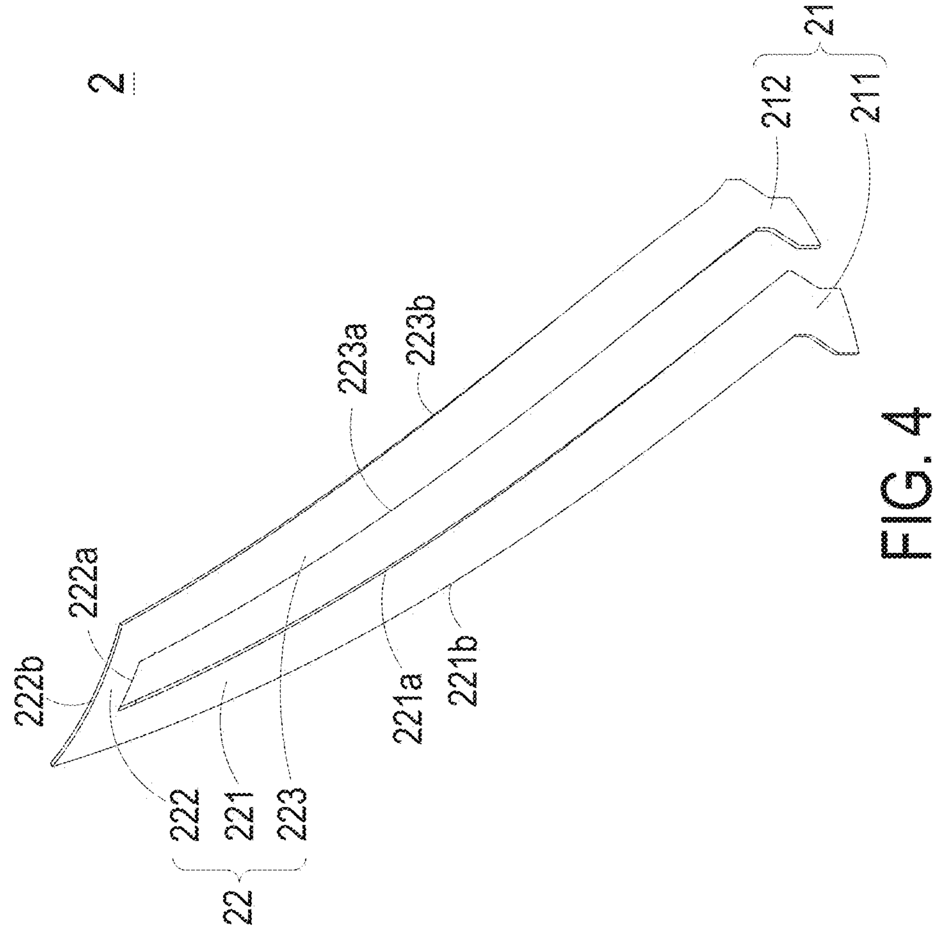
FIG. 4 is a structural schematic diagram illustrating a radiation component of the helical antenna of FIG. 1.

FIG. 1 is a structural schematic diagram illustrating a helical antenna according to a first embodiment of the present disclosure, FIG. 2 is an exploded view illustrating the helical antenna of FIG. 1, FIG. 3 is a top view illustrating the helical antenna of FIG. 1, and FIG. 4 is a structural schematic diagram illustrating a radiation component of the helical antenna of FIG. 1. As shown in FIG. 1 to FIG. 4, in the present embodiment, the helical antenna 100 includes a feeder board 1 and four radiation components 2. The feeder board 1 is configured to feed signal and has a top surface 11. The four radiation components 2 for example but not limited to have the same structure. Each of the four radiation components 2 is electrically coupled with the feeder board 1, respectively, and spirally surrounded toward a direction away from the feeder board 1 to form a dielectric space X. The four radiation components 2 are circularly arranged at intervals, and any cross-section of the four radiation components 2 parallel to the top surface 11 of the feeder board 1 is circular. In other words, the dielectric space X is a cylindrical space, a conical space or a truncated cone space. The dielectric space X is configured to accommodate a dielectric, wherein the dielectric is made of a non-metallic material, such as plastic, fiberglass or air. In the present embodiment, preferably but not exclusively, the dielectric is air. In other words, the dielectric space X accommodates nothing but air, and it is not limited thereto. The radiation components 2 are made of a metal material, and are integrally formed by bending the metal material. Each of the radiation components 2 includes a feeding unit 21 and a radiation portion 22. The feeding unit 21 includes a short circuit portion 211 and a feeding portion 212. An end of the short circuit portion 211 is in connection with the feeder board 1. The feeding portion 212 is spaced adjacent to a side of the short circuit portion 211, and an end of the feeding portion 212 is in connection with the feeder board 1. The radiation portion 22 is configured to transmit and receive a wireless signal in a first frequency band. The first frequency band is for example but no limited to L band, and a range of the first frequency band is between 1525 MHz and 1660 MHz. An end of the radiation portion 22 is in connection with the short circuit portion 211, and the other end of the radiation portion 22 is in connection with the feeding portion 212. Due to the four radiation components 2 are spirally surrounded toward a direction away from the feeder board 1 to form a dielectric space X, and the four radiation components 2 are circularly arranged at intervals, the advantages of reducing signal polarization, enhancing signal stability, increasing signal transmission and reception bandwidth and reducing interference are achieved, and the helical antenna 100 is applicable to wireless signal transmission and reception of continuously moving satellites. In addition, the helical antenna 100 has a simple structure and small size, and can be used in miniaturized communication products.

Please refer to FIG. 1 to FIG. 4. In the present embodiment, the feeding units 21 of the four radiation components 2 of the helical antenna 100 are disposed radially and equidistantly on the feeder board 1 according to an axis Y of the dielectric space X, and an included angle Z from the connecting lines, forming by any two adjacent feeding units 21 and the axis Y, is 90 degrees, but not limited thereto. Currents fed into the radiation portion 22 from the short circuit portion 211 of each of the radiation components 2 are equal. The phase difference of the currents fed from the short circuit portions 211 of any two adjacent radiation components 2 is 90 degrees. In other words, the phases of the currents flowing through the short circuit portions 211 of the four radiation components 2 are 0 degree, 90 degrees, 180 degrees and 270 degrees in sequence, but not limited thereto.

In an embodiment, the radiation portion 22 of each radiation component 2 of the helical antenna 100 is at least one of a multi-segment bending structure, a continuous arc structure, an irregular structure, or a combination thereof.

Please refer to FIG. 1 and FIG. 2. In the present embodiment, the feeder board 1 includes a plurality of recesses 12. The plurality of recesses 12 are recessed on the top surface 11, respectively, and are configured for the short circuit portion 211 and the feeding portion 212 to be plugged therein, so that the feeding unit 21 is electrically coupled with the feeder board 1, and the current fed by the feeder board 1 is provided to the radiation component 2. Due to the arrangement of the recesses 12, the radiation component 2 can be assembled and positioned on the top surface 11 of the feeder board 1, and the advantages of simplifying manufacturing process and improving product accuracy are achieved. In an embodiment, the short circuit portion 211 and the feeding portion 212 are formed by welding a metal material and disposed between the radiation portion 22 and the feeder board 1, so as to achieve the advantages of simplifying manufacturing process and reducing cost.

Please refer to FIG. 1 to FIG. 4. In the present embodiment, the radiation portion 22 of each radiation component 2 of the helical antenna 100 is a reversed U-shaped multi-segment bending structure. The radiation portion 22 includes a first segment 221, a first connection part 222 and a second segment 223. An end of the first segment 221 is in connection with the short circuit portion 211, and the other end of the first segment 221 is in connection with the first connection part 222. An end of the second segment 223 is in connection with the feeding portion 212, and the other end of the second segment 223 is in connection with the first connection part 222. The first connection part 222 is in connection between the first segment 221 and the second segment 223.

Please refer to FIG. 1 to FIG. 4. In the present embodiment, the first segment 221 of the radiation portion 22 has a first segment inner side **221*a* and a first segment outer side 221*b*. The first connection part 222 has a first connection part inner side 222*a* and a first connection part outer side 222*b*. The second segment 223 has a second segment inner side 223*a* and a second segment outer side 223*b*. An end of the first segment inner side 221*a* is in connection with the short circuit portion 211, and the other end of the first segment inner side 221*a* is in connection with the first connection part inner side 222*a*. An end of the first segment outer side 221*b* is in connection with the short circuit portion 211, the other end of the first segment outer side 221*b* is in connection with the first connection part outer side 222***b*. An end of the second segment inner side 223*a* is in connection with the feeding portion 212, the other end of the second segment inner side 223*a* is in connection with the first connection part inner side 222*a*. An end of the second segment outer side 223*b* is in connection with the feeding portion 212, the other end of the second segment outer side 223*b* is in connection with the first connection part outer side 222*b*. The first segment inner side 221*a*, the first segment outer side 221*b*, the second segment inner side 223*a* and the second segment outer side 223*b* are parallel to each other, respectively. In the present embodiment, the dielectric accommodated in the dielectric space X is air, and the length of the first segment inner side 221*a* or the length of the second segment inner side 223*a* is an integer multiple of the 0.5 times of one of the received wavelength range. In some embodiments, when the dielectric accommodated in the dielectric space X is other than air, the length of the first segment inner side 221*a* or the length of the second segment inner side 223*a* is not limited to the above-mentioned embodiment and can be adjusted according to the practical requirements. Please refer to FIG. 2, in the present embodiment, an acute angle W is formed between an extending line of the first segment inner side 221*a* and the extending plane of the top surface 11 of the feeder board 1, and the acute angle W is in a range between 45 degrees and 75 degrees, but not limited thereto. In an embodiment, preferably but not exclusively, the acute angle W is 60 degrees.

In the present embodiment, the length of the first segment inner side 221*a* of the first segment 221 of the radiation portion 22 is equal to the length of the second segment inner side 223*a* of the second segment 223, and the first connection part inner side 222*a* and the first connection part outer side 222*b* are parallel to the top surface 11 of the feeder board 1. Due to the above-mentioned arrangement of the radiation portion 22, the advantage of optimizing the efficiency of transmitting and receiving wireless signals in the first frequency band is achieved. In some embodiments, the length of the first segment inner side 221*a* of the first segment 221 is not equal to the length of the second segment inner side 223*a* of the second segment 223, and the length of the first segment inner side 221*a* and the length of the second segment inner side 223*a* are not limited to the above-mentioned embodiment and can be adjusted according to the practical requirements.

In an embodiment, the first segment 221, the first connection part 222 and the second segment 223 have the same width. In an embodiment, the width of the first segment 221, the width of the first connection part 222 and the width of the second segment 223 are in a range between 1 millimeter and 2 millimeters, but not limited thereto. In an embodiment, preferably but not exclusively, the width of the first segment 221, the width of the first connection part 222 and the width of the second segment 223 are 1.5 millimeters. In an embodiment, the first segment inner side 221*a*, the first segment outer side 221*b*, the second segment inner side 223*a* and the second segment outer side 223*b* have the same length. In an embodiment, the length of the first segment inner side 221*a*, the length of the first segment outer side 221*b*, the length of the second segment inner side 223*a* and the length of the second segment outer side 223*b* are in a range between 20 millimeters and 40 millimeters. In an embodiment, preferably but not exclusively, the length of the first segment inner side 221*a*, the length of the first segment outer side 221*b*, the length of the second segment inner side 223*a* and the length of the second segment outer side 223*b* are 30 millimeters. Due to the arrangements of the length and width of the segments of the radiation portion 22, the advantage of optimizing the efficiency of transmitting and receiving the wireless signals in the first frequency band is achieved.

Figure 5:
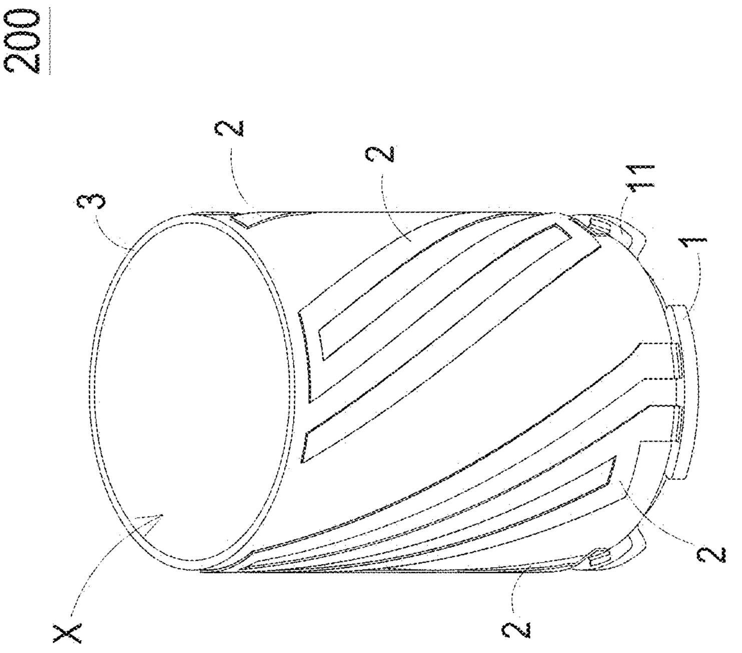
FIG. 5 is a structural schematic diagram illustrating a helical antenna according to a second embodiment of the present disclosure.
Figure 6:
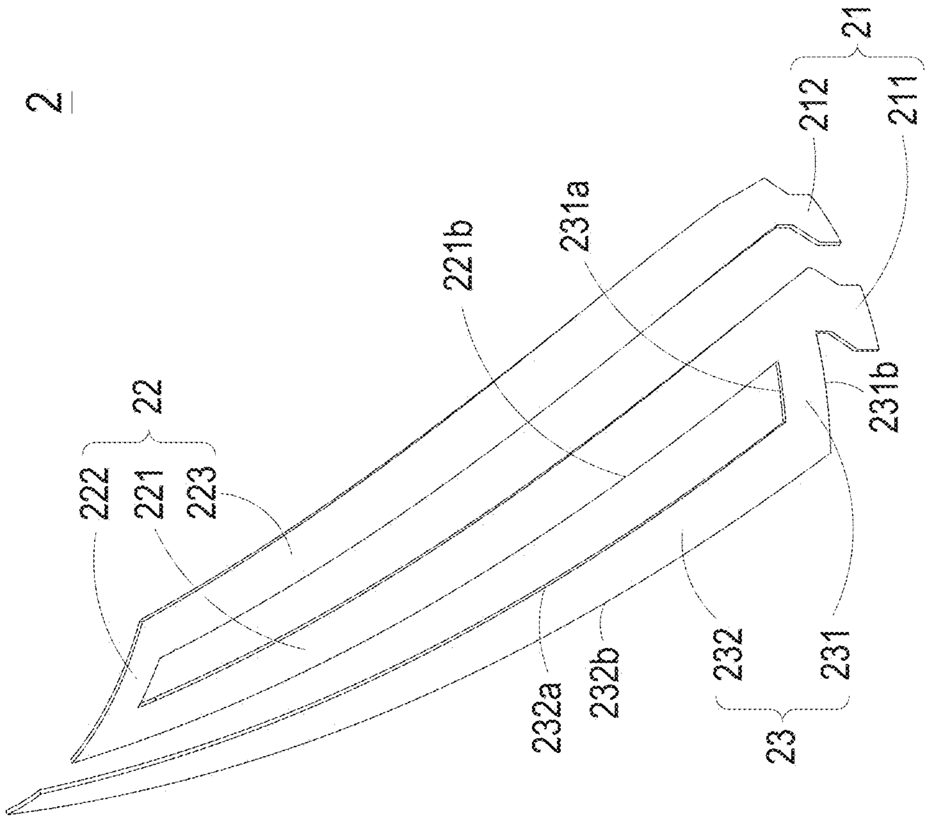
FIG. 6 is a structural schematic diagram illustrating a radiation component of the helical antenna of FIG. 5.

FIG. 5 is a structural schematic diagram illustrating a helical antenna according to a second embodiment of the present disclosure, and FIG. 6 is a structural schematic diagram illustrating a radiation component of the helical antenna of FIG. 5. Please refer to FIG. 5 and FIG. 6. The structure of the helical antenna 200 of the present embodiment is similar to that of the helical antenna 100 shown in FIG. 1 to FIG. 4, wherein the same references represent the same components and functions, and would not be repeatedly described hereinafter. Different from the helical antenna 100 shown in FIG. 1 to FIG. 4, the helical antenna 200 of the present embodiment further includes a dielectric component 3. The dielectric component 3 is disposed in the dielectric space X, and the four radiation components 2 are attached on a surface of the dielectric component 3. In the present embodiment, the dielectric component 3 is a flexible circuit board, and the four radiation components 2 are disposed on a surface of the flexible circuit board. By rolling the flexible circuit board into a hollow cylindrical structure, the four radiation components 2 are surrounded on the dielectric component 3 to form the dielectric space X. The flexible circuit board is disposed in the dielectric space X, and disposed on the top surface 11 of the feeder board 1. Consequently, the helical antenna 200 has a simple structure and small size, is easy to be manufactured, and can be applied to miniaturized communication products. In an embodiment, the diameter of the hollow cylindrical structure formed by the rolled flexible circuit board is in a range between 15 millimeters and 25 millimeters. In an embodiment, preferably but not exclusively, the diameter of the hollow cylindrical structure is 15 millimeters.

Please refer to FIG. 5 and FIG. 6. Each of the radiation components 2 of the helical antenna 200 of the present embodiment includes a first extension portion 23. The first extension portion 23 is configured to transmit and receive a wireless signal in a second frequency band. The second frequency band is for example but no limited to a part of S band, and the frequency of the S band is in the range between 1980 MHz and 2200 MHz. The first extension portion 23 is for example but no limited to a multi-segment bending structure. An end of the first extension portion 23 is in connection with the first segment 221 of the radiation portion 22, and disposed adjacent to the short circuit portion 211, and the other end of the first extension portion 23 is a free end. Due to the arrangement of the radiation portion 22 and the first extension portion 23, the helical antenna 200 is capable of transmitting and receiving the wireless signals in the first frequency band and the second frequency band, and the advantage of performing multi-frequency signal transmission and reception is achieved.

Please refer to FIG. 5 and FIG. 6. In the present embodiment, the first extension portion 23 is for example but not limited to a L-shape bending structure, and includes a second connection part 231 and a third segment 232. An end of the second connection part 231 is in connection with the first segment outer side 221*b* of the first segment 221 and disposed adjacent to the short circuit portion 211, and the other end of the second connection part 231 is in connection with an end of the third segment 232. The other end of the third segment 232 is a free end. Due to the arrangement and connection of the second connection part 231 and the third segment 232, the transmission and reception of the wireless signals in the second frequency band is achieved.

Please refer to FIG. 5 and FIG. 6. In the present embodiment, the second connection part 231 has a second connection part inner side 231*a* and a second connection part outer side 231*b*. The third segment 232 has a third segment inner side 232*a* and a third segment outer side 232*b*. An end of the second connection part inner side 231*a* is in connection with the first segment outer side 221*b*, and the other end of the second connection part inner side 231*a* is in connection with an end of the third segment inner side 232*a*. An end of the second connection part outer side 231*b* is in connection with the first segment outer side 221*b*, and disposed adjacent to the short circuit portion 211. The other end of the second connection part outer side 231*b* is in connection with the third segment outer side 232*b*. In an embodiment, the third segment inner side 232*a* and the third segment outer side 232*b* are parallel to the first segment outer side 221*b* of the first segment 221, respectively. The second connection part 231 and the third segment 232 have the same width. The width of the second connection part 231 and the width of the third segment 232 are in a range between 1 millimeter and 2 millimeters. Preferably but not exclusively, the width of the second connection part 231 or the width of the third segment 232 is 1.5 millimeters. The length of the third segment inner side 232*a* and the length of the third segment outer side 232*b* are in the range between 20 millimeters and 40 millimeters. Preferably but not exclusively, the length of the third segment inner side 232*a* or the length of the third segment outer side 232*b* is 30 millimeters. Due to the length, the width, the connecting structure and the arrangement of the second connection part 231 and the third segment 232, the helical antenna 200 is capable of transmitting and receiving the wireless signals in the second frequency band, and the advantage of improving the efficiency of transmitting and receiving the wireless signal is achieved.

Figure 7:
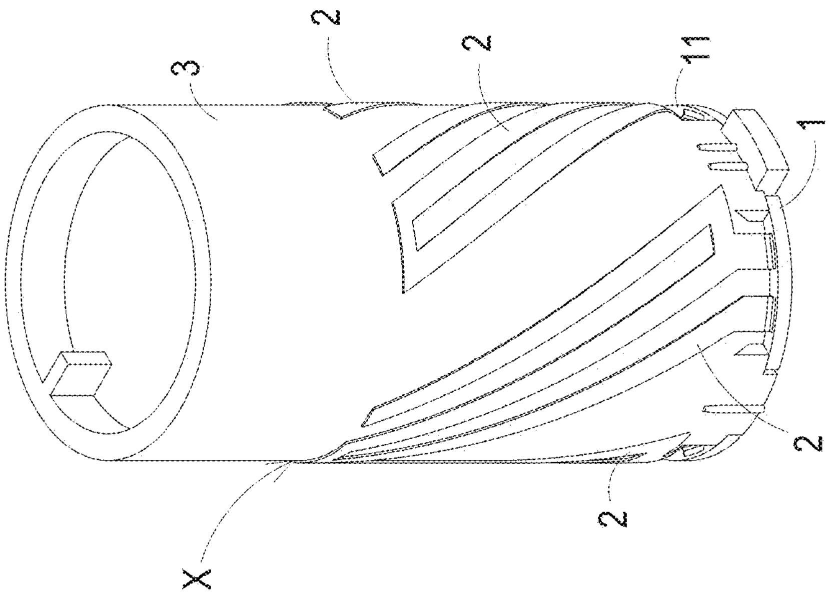
FIG. 7 is a structural schematic diagram illustrating a helical antenna according to a third embodiment of the present disclosure.
Figure 8:
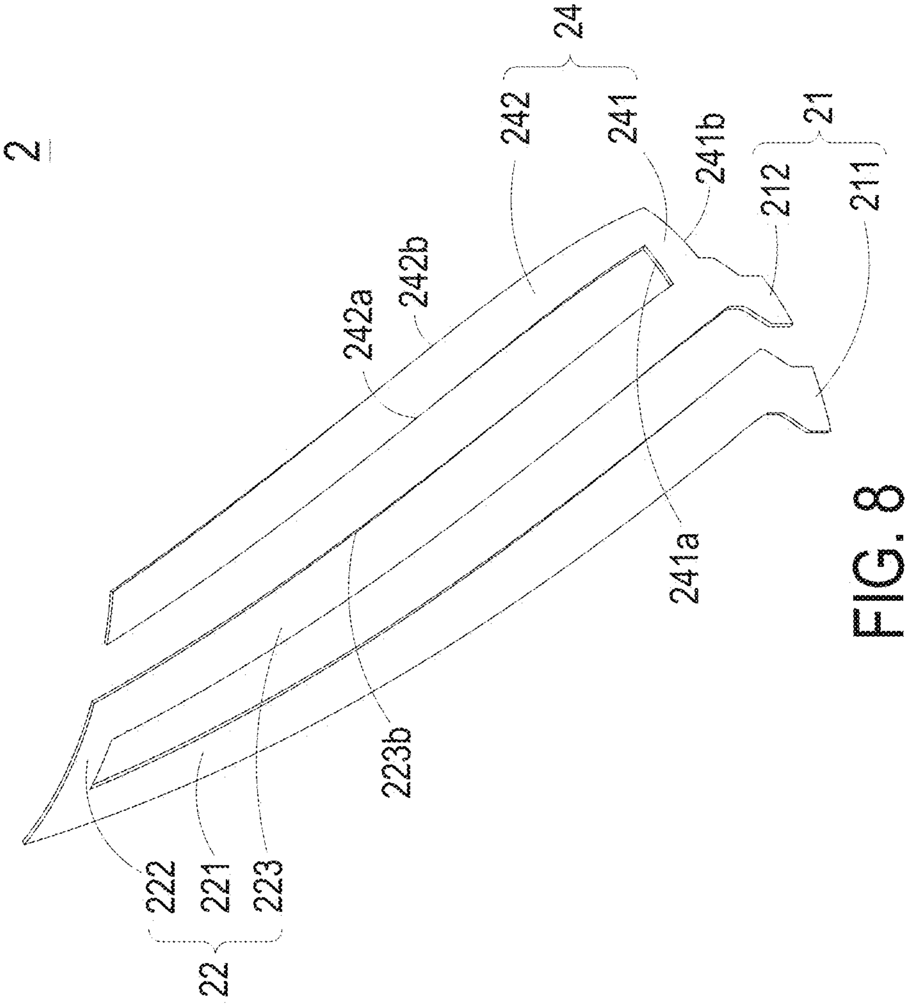
FIG. 8 is a structural schematic diagram illustrating a radiation component of the helical antenna of FIG. 7.

FIG. 7 is a structural schematic diagram illustrating a helical antenna according to a third embodiment of the present disclosure, and FIG. 8 is a structural schematic diagram illustrating a radiation component of the helical antenna of FIG. 7. Please refer to FIG. 7 and FIG. 8. The structure of the helical antenna 300 of the present embodiment is similar to that of the helical antenna 100 shown in FIG. 1 to FIG. 4, wherein the same references represent the same components and functions, and would not be repeatedly described hereinafter. Different from the helical antenna 100 shown in FIG. 1 to FIG. 4, the helical antenna 300 of the present embodiment further includes a dielectric component 3. The dielectric component 3 is disposed in the dielectric space X, and the four radiation components 2 are attached on a surface of the dielectric component 3. In the present embodiment, the dielectric component 3 is a solid cylinder made of a non-metallic material, wherein the non-metallic material is one of plastic and fiberglass, but not limited thereto. The helical antenna 300 has a simple structure and small size, is easy to be manufactured, and can be applied to miniaturized communication products. In an embodiment, a diameter of the solid cylinder is in a range between 15 millimeters and 25 millimeters. Preferably but not exclusively, the diameter of the solid cylinder is 20 millimeters.

Please refer to FIG. 7 and FIG. 8. In the present embodiment, each of the radiation components 2 of the helical antenna 300 includes a second extension portion 24. The second extension portion 24 is configured to transmit and receive a wireless signal in a third frequency band. The third frequency band is for example but no limited to a part of S band, and the frequency of the S band is in the range between 1980 MHz and 2200 MHz. The second extension portion 24 is a multi-segment bending structure. An end of the second extension portion 24 is in connection with the second segment 223 of the radiation portion 22 and disposed adjacent to the feeding portion 212, and the other end of the second extension portion 24 is a free end. Due to the arrangement of the radiation portion 22 and the second extension portion 24, the helical antenna 300 is capable of transmitting and receiving the wireless signals in the first frequency band and the third frequency band, and the advantage of performing multi-frequency signal transmission and reception is achieved.

Please refer to FIG. 7 and FIG. 8. In the present embodiment, the second extension portion 24 is for example but not limited to a reversed L-shape bending structure, and includes a third connection part 241 and a fourth segment 242. An end of the third connection part 241 is in connection with the second segment outer side 223*b* of the second segment 223. The other end of the third connection part 241 is in connection with an end of the fourth segment 242. The other end of the fourth segment 242 is a free end. Due to the arrangement and connection of the third connection part 241 and the fourth segment 242, the helical antenna 300 is capable of transmitting and receiving the wireless signals in the third frequency band.

Please refer to FIG. 7 and FIG. 8. In the present embodiment, the third connection part 241 has a third connection part inner side 241*a* and a third connection part outer side 241*b*. The fourth segment 242 has a fourth segment inner side 242*a* and a fourth segment outer side 242*b*. An end of the third connection part inner side 241*a* is in connection with the second segment outer side 223*b* of the second segment 223, and the other end of the third connection part inner side 241*a* is in connection with an end of the fourth segment inner side 242*a*. An end of the third connection part outer side 241*b* is in connection with the second segment outer side 223*b* of the second segment 223, and disposed adjacent to the feeding portion 212. The other end of the third connection part outer side 241*b* is in connection with the fourth segment outer side 242*b*. In an embodiment, the fourth segment inner side 242*a* and the fourth segment outer side 242*b* are parallel to the second segment outer side 223*b* of the second segment 223, respectively. The third connection part 241 and the fourth segment 242 have the same width. The widths of the third connection part 241 and the fourth segment 242 are in a range between 1 millimeter and 2 millimeters. Preferably but not exclusively, the width of the third connection part 241 or the width of the fourth segment 242 is 1.5 millimeters. The length of the fourth segment inner side 242*a* and the length of the fourth segment outer side 242*b* of the fourth segment 242 are in a range between 20 millimeters and 40 millimeters. Preferably but not exclusively, the length of the fourth segment inner side 242*a* or the length of the fourth segment outer side 242*b* is 30 millimeters. Due to the length, width and the connecting structure and the arrangement of the third connection part 241 and the fourth segment 242, the helical antenna 300 is capable of transmitting and receiving the wireless signal in the third frequency band, and the advantage of improving the efficiency of transmitting and receiving the wireless signal is achieved.

Figure 9:
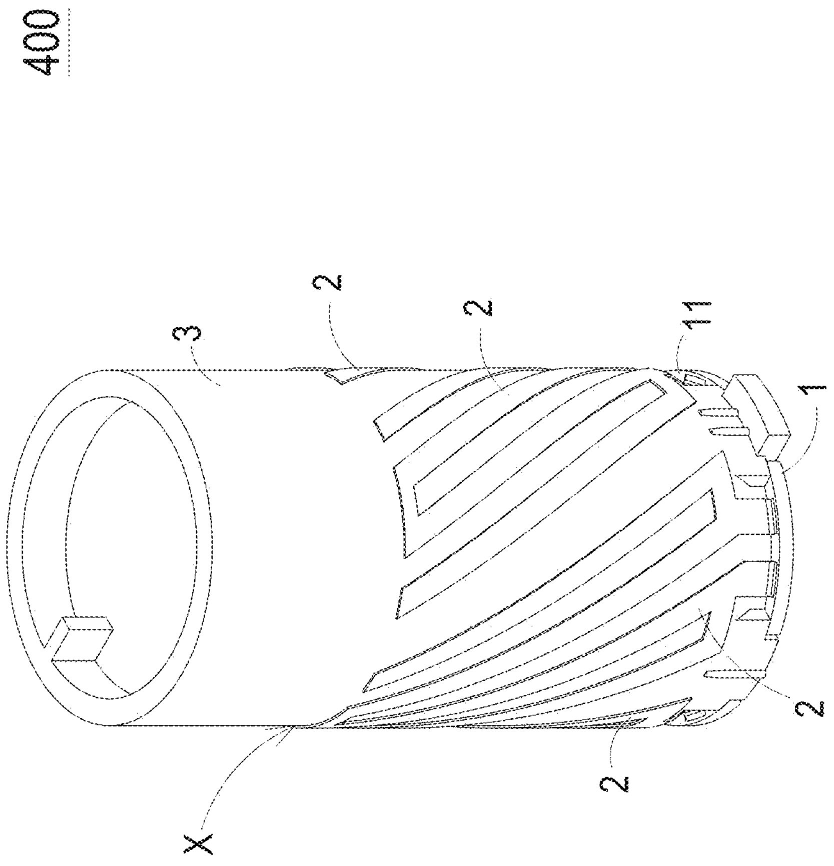
FIG. 9 is a structural schematic diagram illustrating a helical antenna according to a fourth embodiment of the present disclosure.
Figure 10:
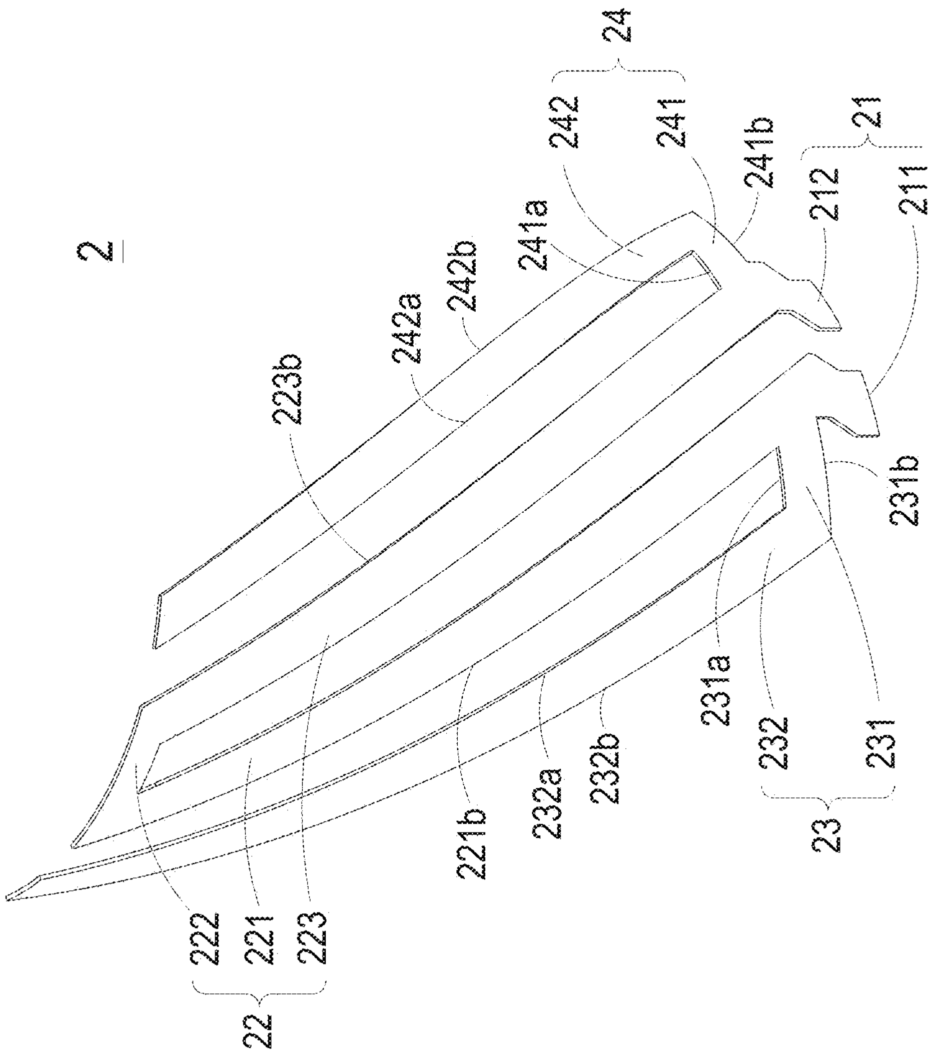
FIG. 10 is a structural schematic diagram illustrating a radiation component of the helical antenna of FIG. 9.

FIG. 9 is a structural schematic diagram illustrating a helical antenna according to a fourth embodiment of the present disclosure, and FIG. 10 is a structural schematic diagram illustrating a radiation component of the helical antenna of FIG. 9. Please refer to FIG. 9 and FIG. 10. The structure of the helical antenna 400 of the present embodiment is similar to that of the helical antenna 100 shown in FIG. 1 to FIG. 4, wherein the same references represent the same components and functions, and would not be repeatedly described hereinafter. Different from the helical antenna 100 shown in FIG. 1 to FIG. 4, the helical antenna 400 of the present embodiment further includes a dielectric component 3. The dielectric component 3 is disposed in the dielectric space X, and the four radiation components 2 are attached on a surface of the dielectric component 3. In the present embodiment, the dielectric component 3 is a solid cylinder made of a non-metallic material, wherein the non-metallic material is one of plastic and fiberglass, but not limited thereto. The helical antenna 300 has a simple structure and small size, is easy to be manufactured, and can be applied to miniaturized communication products. In an embodiment, a diameter of the solid cylinder is in a range between 15 millimeters and 25 millimeters. Preferably but not exclusively, the diameter of the solid cylinder is 20 millimeters.

Please refer to FIG. 9 and FIG. 10. In the present embodiment, each of the radiation components 2 of the helical antenna 400 includes a first extension portion 23 and a second extension portion 24. The first extension portion 23 is configured to transmit and receive a wireless signal in a second frequency band. The second extension portion 24 is configured to transmit and receive a wireless signal in a third frequency band. The second frequency band and the third frequency band jointly cover the S band, and the frequency of the S band is in the range between 1980 MHz and 2200 MHz. The first extension portion 23 and the second extension portion 24 are multi-segment bending structures. An end of the first extension portion 23 is in connection with the first segment 221 and disposed adjacent to the short circuit portion 211, and the other end of the first extension portion 23 is a free end. An end of the second extension portion 24 is in connection with the second segment 223 of the radiation portion 22 and disposed adjacent to the feeding portion 212, and the other end of the second extension portion 24 is a free end. Due to the arrangement of the radiation portion 22, the first extension portion 23 and the second extension portion 24, the helical antenna 300 is capable of transmitting and receiving the wireless signals in the first frequency band, the second frequency band and the third frequency band, and the advantage of multi-frequency transmission and reception is achieved.

Please refer to FIG. 9 and FIG. 10. In the present embodiment, the detail structures and function of the first extension portion 23 of the helical antenna 400 of the present embodiment are similar to that of the first extension portion 23 of the helical antenna 200 shown in FIG. 5 and FIG. 6, and would not be repeatedly described hereinafter. In addition, the detail structures and function of the second extension portion 24 of the helical antenna 400 of the present embodiment are similar to that of the second extension portion 24 of the helical antenna 300 shown in FIG. 7 and FIG. 8, and would not be repeatedly described hereinafter. Due to the length, the width and the connecting structure and the arrangement of the first extension portion 23 and the second extension portion 24, the helical antenna 400 is capable of transmitting and receiving the wireless signals in the second frequency band and the third frequency band, and the advantage of improving the efficiency of transmitting and receiving the wireless signal is achieved.

From above descriptions, the present disclosure provides a helical antenna. The helical antenna includes four radiation components spirally surrounded toward a direction away from the feeder board to form a dielectric space, and the four radiation components are circularly arranged at intervals. Consequently, the advantages of reducing signal polarization, enhancing signal stability, increasing signal transmission and reception bandwidth and reducing interference are achieved, and the helical antenna is applicable to wireless signal transmission and reception of continuously moving satellites. Due to the arrangement of the radiation portion, the first extension portion and the second extension portion, the helical antenna is capable of transmitting and receiving the wireless signals in the first frequency band, the second frequency band and the third frequency band, and the advantage of improving the efficiency of transmitting and receiving the wireless signal is achieved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A helical antenna comprising:

a feeder board configured to feed signal and having a top surface; and four radiation components electrically coupled with the feeder board, respectively, wherein the four radiation components are spirally surrounded toward a direction away from the feeder board to form a dielectric space, wherein the four radiation components are circularly arranged at intervals, and any cross-section of the four radiation components parallel to the top surface of the feeder board is circular, wherein each of the radiation components comprises:

a feeding unit comprising a short circuit portion and a feeding portion, wherein an end of the short circuit portion is in connection with the feeder board, wherein the feeding portion is spaced adjacent to a side of the short circuit portion, and an end of the feeding portion is in connection with the feeder board; and a radiation portion configured to transmit and receive a wireless signal in a first frequency band, wherein an end of the radiation portion is in connection with the short circuit portion, and the other end of the radiation portion is in connection with the feeding portion;

wherein the radiation portion is a reversed U-shaped multi-segment bending structure;

wherein the radiation portion comprises a first segment, a first connection part and a second segment, wherein an end of the first segment is in connection with the short circuit portion, and the other end of the first segment is in connection with the first connection part, wherein an end of the second segment is in connection with the feeding portion, and the other end of the second segment is in connection with the first connection part, wherein the first connection part is in connection between the first segment and the second segment; and wherein the first segment has a first segment inner side and a first segment outer side, the first connection part has a first connection part inner side and a first connection part outer side, and the second segment has a second segment inner side and a second segment outer side, wherein an end of the first segment inner side is in connection with the short circuit portion, and the other end of the first segment inner side is in connection with the first connection part inner side, wherein an end of the first segment outer side is in connection with the short circuit portion, and the other end of the first segment outer side is in connection with the first connection part outer side, wherein an end of the second segment inner side is in connection with the feeding portion, and the other end of the second segment inner side is in connection with the first connection part inner side, wherein an end of the second segment outer side is in connection with the feeding portion, and the other end of the second segment outer side is in connection with the first connection part outer side, wherein the first segment inner side, the first segment outer side, the second segment inner side and the second segment outer side are parallel to each other, respectively;

wherein each of the four radiation components further comprises at least one of:

a first extension portion, wherein the first extension portion is configured to transmit and receive a wireless signal in a second frequency band, wherein the first extension portion is a multi-segment bending structure, an end of the first extension portion is in connection with the first segment of the radiation portion and disposed adjacent to the short circuit portion, and the other end of the first extension portion is a free end; and wherein the first extension portion is a L-shape bending structure, and comprises a second connection part and a third segment, wherein an end of the second connection part is in connection with the first segment outer side of the first segment, and the other end of the second connection part is in connection with an end of the third segment, wherein the other end of the third segment is a free end; and/or a second extension portion, wherein the second extension portion is configured to transmit and receive a wireless signal in a third frequency band, wherein the second extension portion is a multi-segment bending structure, an end of the second extension portion is in connection with the second segment of the radiation portion and disposed adjacent to the feeding portion, and the other end of the second extension portion is a free end; and wherein the second extension portion is a reversed L-shape bending structure, and comprises a third connection part and a fourth segment, wherein an end of the third connection part is in connection with the second segment outer side, and the other end of the third connection part is in connection with an end of the fourth segment, wherein the other end of the fourth segment is a free end.

2. The helical antenna according to claim 1, wherein the feeding units of the four radiation components are disposed radially and equidistantly on the feeder board according to an axis, and an included angle from the connecting lines, forming by any two adjacent feeding units and the axis, is 90 degrees, wherein currents fed into the radiation portion from the short circuit portion of each of the four radiation components are equal, wherein the phase difference of the currents fed from the short circuit portions of any two adjacent radiation components is 90 degrees, wherein the short circuit portion and the feeding portion are formed by welding a metal material and disposed between the radiation portion and the feeder board.

3. The helical antenna according to claim 1, wherein the length of the first segment inner side or the length of the second segment inner side is an integer multiple of the 0.5 times of one of the received wavelength range, wherein an acute angle is formed between an extending line of the first segment inner side and the extending plane of the top surface of the feeder board, and the acute angle is in a range between 45 degrees and 75 degrees, wherein the length of the first segment inner side is equal to the length of the second segment inner side, and the first connection part inner side and the first connection part outer side are parallel to the top surface of the feeder board.

4. The helical antenna according to claim 3, wherein the dielectric space is configured to accommodate a dielectric, wherein the dielectric is air.

5. The helical antenna according to claim 1, wherein the first segment, the first connection part and the second segment have the same width, and the width of the first segment, the width of the first connection part and the width of the second segment are in a range between 1 millimeter and 2 millimeters, wherein the first segment inner side, the first segment outer side, the second segment inner side and the second segment outer side have the same length, and the length of the first segment inner side, the length of the first segment outer side, the length of the second segment inner side and the length of the second segment outer side are in a range between 20 millimeters and 40 millimeters.

6. The helical antenna according to claim 1, wherein the second connection part has a second connection part inner side and a second connection part outer side, and the third segment has a third segment inner side and a third segment outer side, wherein an end of the second connection part inner side is in connection with the first segment outer side, and the other end of the second connection part inner side is in connection with an end of the third segment inner side, wherein an end of the second connection part outer side is in connection with the first segment outer side and disposed adjacent to the short circuit portion, and the other end of the second connection part outer side is in connection with the third segment outer side, wherein the third segment inner side and the third segment outer side are parallel to the first segment outer side, respectively, wherein the second connection part and the third segment have the same width, and the width of the second connection part and the width of the third segment are in a range between 1 millimeter and 2 millimeters, wherein the length of the third segment inner side and the length of the third segment outer side are in a range between 20 millimeters and 40 millimeters.

7. The helical antenna according to claim 1, wherein the third connection part has a third connection part inner side and a third connection part outer side, and the fourth segment has a fourth segment inner side and a fourth segment outer side, wherein an end of the third connection part inner side is in connection with the second segment outer side, and the other end of the third connection part inner side is in connection with an end of the fourth segment inner side, wherein an end of the third connection part outer side is in connection with the second segment outer side and disposed adjacent to the feeding portion, and the other end of the third connection part outer side is in connection with the fourth segment outer side, wherein the fourth segment inner side and the fourth segment outer side are parallel to the second segment outer side, respectively, wherein the third connection part and the fourth segment have the same width, and the width of the third connection part and the width of the fourth segment are in a range between 1 millimeter and 2 millimeters, wherein the length of the fourth segment inner side and the length of the fourth segment outer side are in a range between 20 millimeters and 40 millimeters.

8. The helical antenna according to claim 1, wherein the helical antenna comprises a dielectric component, wherein the dielectric component is disposed in the dielectric space, and the four radiation components are attached on a surface of the dielectric component, respectively.

9. The helical antenna according to claim 8, wherein the dielectric component is a solid cylinder made of a non-metallic material, wherein the non-metallic material is one of plastic and fiberglass, wherein a diameter of the solid cylinder is in a range between 15 millimeters and 25 millimeters.

10. The helical antenna according to claim 8, wherein the dielectric component is a hollow cylindrical structure formed by rolling a flexible circuit board, wherein a diameter of the hollow cylindrical structure is in a range between 15 millimeters and 25 millimeters.

11. The helical antenna according to claim 1, wherein each of the four radiation components is made of a metal material, and is integrally formed by bending the metal material.

* * * * *